(12) United States Patent
Cashatt et al.

(10) Patent No.: US 6,868,749 B2
(45) Date of Patent: Mar. 22, 2005

(54) BEARING CONFIGURATION AND METHOD FOR REDUCING NOISE IN A BEARING

(75) Inventors: Paul D. Cashatt, Saginaw, MI (US); Alexander J. Murray, Tychy (PL)

(73) Assignee: Delphi Technologies, Inc., Troy, MI (US)

( * ) Notice: Subject to any disclaimer, the term of this patent is extended or adjusted under 35 U.S.C. 154(b) by 154 days.

(21) Appl. No.: 10/305,445

(22) Filed: Nov. 26, 2002

(65) Prior Publication Data

US 2003/0097895 A1 May 29, 2003

Related U.S. Application Data

(60) Provisional application No. 60/333,846, filed on Nov. 28, 2001.

(51) Int. Cl.[7] .............................................. B62D 1/16
(52) U.S. Cl. ........................ 74/492; 384/450; 384/517; 384/563
(58) Field of Search ................................ 384/450, 490, 384/504, 512, 517, 563; 74/492, 493, 425

(56) References Cited

U.S. PATENT DOCUMENTS

| | | | |
|---|---|---|---|
| 4,325,590 A | | 4/1982 | Pethis ..................... 308/184 R |
| 4,729,674 A | * | 3/1988 | Siebert et al. ............... 384/505 |
| 5,176,457 A | * | 1/1993 | Hofmann et al. ........... 384/537 |
| 5,752,774 A | | 5/1998 | Heshmat et al. ............ 384/549 |
| 6,070,325 A | * | 6/2000 | Miyata et al. ........... 29/898.09 |
| 6,082,907 A | * | 7/2000 | Arvidsson .................... 384/563 |
| 6,164,407 A | | 12/2000 | Cheng ......................... 180/444 |
| 6,200,241 B1 | | 3/2001 | Pinotti et al. |
| 6,269,709 B1 | | 8/2001 | Sangret ........................ 74/398 |
| 6,318,201 B1 | * | 11/2001 | Yoshioka ..................... 74/424 |
| 6,354,743 B2 | * | 3/2002 | Muraki et al. .............. 384/490 |
| 6,394,658 B1 | * | 5/2002 | Crowell ....................... 384/537 |
| 6,412,719 B1 | * | 7/2002 | Hyon .......................... 242/260 |
| 6,467,366 B1 | | 10/2002 | Gierc |
| 6,502,996 B2 | * | 1/2003 | Joki ............................ 384/571 |
| 6,544,140 B2 | * | 4/2003 | Gradu et al. ................ 475/246 |
| 2002/0097935 A1 | * | 7/2002 | Beckers et al. ............. 384/490 |
| 2002/0118901 A1 | * | 8/2002 | Takamizawa et al. ....... 384/517 |
| 2004/0109624 A1 | * | 6/2004 | Kawaguchi et al. ........ 384/504 |

OTHER PUBLICATIONS

Kozaki, Yuji, Goro Hirose, Shozo Sekiya, and Yasuhiko Miyaura, "Electronic Power Steering (EPS)", *Motion & Control*, Issue No. 6, 1999.

Lacey, Steve J., Andy Kemble, and Noriyuki Itoh, "Performance Characteristics of Fixed Preload Large Boar Angular Contact Ball Bearings for Machine Tools", *Motion & Control*, Issue No. 2, 1997.

* cited by examiner

*Primary Examiner*—David M. Fenstermacher
(74) *Attorney, Agent, or Firm*—Michael D. Smith

(57) ABSTRACT

A bearing configuration in which a shaft is supported by a first and second bearings, the second bearing being spaced from the first bearing. The first bearing and said second bearing are supported by a corresponding first bore and second bore in a shaft housing, a first axis being coincident with an axis of the first bore and a second axis being coincident with an axis of the second bore. The first axis and the second axis are purposefully offset from one another a sufficient distance to substantially eliminate internal clearance within the first bearing.

16 Claims, 2 Drawing Sheets

BEARING CONFIGURATION AND METHOD FOR REDUCING NOISE IN A BEARING

This application claims the benefit of earlier-filed copending U.S. provisional application No. 60/333,846, filed Nov. 28, 2001.

BACKGROUND

The present invention relates to bearings, and particularly relates to a bearing configuration for reducing noise therein. The invention is useful in gear sets for electric power steering systems.

Noise in gear sets is generally undesirable, and particularly undesirable in certain applications, such as in electric power steering systems where the noise is felt at the handwheel and/or heard in the passenger compartment. Prior attempts at controlling noise in such systems have focused on reducing backlash between the teeth of a pair of gears and on dampening the noise. For example of such approaches, see U.S. Pat. No. 6,164,407, issued Dec. 26, 2000 to Cheng; U.S. Pat. No. 6,269,709, issued Aug. 7, 2001 to Sangret, and the article entitled, "Electric Power Steering" by Yuji Kozaki et al., published in 1999 in the journal, *Motion & Control*, issue 6, the latter of which is incorporated herein by reference in its entirety.

Although the methods used heretofore to reduce noise and the deleterious effects thereof significantly improve the performance of the gear set, they have not addressed a significant contributor to noise: the bearings. Tolerance and clearance in the roller or ball bearings supporting a shaft allows the shaft to move axially slightly, which introduces noise into the system. Traditional means for reducing bearing noise is not effective in some applications, such as in systems encountering high axial loads. In such systems, the bearings contribute noise despite axially pre-loading the bearing when a great enough axial force is exerted in the opposite direction against the pre-load. Reduction of bearing noise by radial expansion of the inner race to remove the clearance in the bearing is too expensive. The prior art has therefore not adequately addressed this source of noise.

SUMMARY

Disclosed herein is a bearing configuration including a shaft supported by a first bearing and a second bearing, the second bearing being spaced from the first bearing. The first bearing and said second bearing are supported by a corresponding first bore and second bore in a shaft housing, a first axis being coincident with an axis of the first bore and a second axis being coincident with an axis of the second bore. The first axis and the second axis are purposefully offset from one another a sufficient distance to substantially eliminate internal clearance within the first bearing.

The disadvantages of the prior art noted above and otherwise are overcome by a an offset intentionally created between bearing bores along the bearing axis of the shaft, thus placing inner and outer races of the bearing at a slight angle to one another.

BRIEF DESCRIPTION OF THE DRAWINGS

These and other features will be appreciated by reference to the detailed description and accompanying drawings in which.

DETAILED DESCRIPTION

Figure 1:
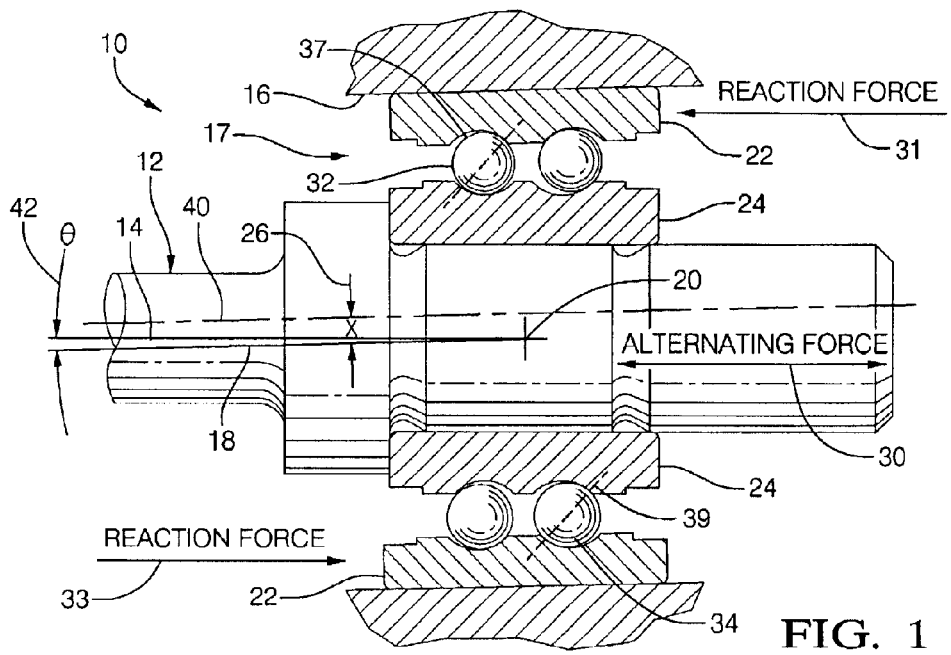
FIG. 1 shows a bearing positioned with an intentional offset therein.

FIG. 1 schematically represents a bearing positioned in an offset bore; the offset is exaggerated for clarity. A shaft 12 is supported within bore 16 by a bearing set 17. Bore 16 is offset from axis 40, which is common with an opposite bearing (not shown). Thus, bore 16 is offset from axis 40 by a distance 26, which causes an angular displacement 42 between outer race 22 and inner bearing race 24 of theta ($\theta$) radians, which is the same as the angular displacement between bore 16 and shaft 12.

Bearing set 17 has no clearance, and therefore will not admit noise into the system. Furthermore, it handles axial loads well. When shaft 12 encounters alternating axial loads 30, the bearing responds with a reaction force opposite the axial load. When axial load 30 is exerted to the right as seen in FIG. 1, a reaction force 31 is exerted through ball bearing 32. Likewise, when the axial load 30 is exerted to the left as seen in FIG. 1, a reaction force 33 is applied to the right through ball bearing 34.

Setting bore offset distance 26 too high will cause excessive friction in the bearings, which may cause them to wear prematurely. Setting bore offset distance 26 too low will not adequately reduce noise. Determining the optimum bore offset distance can be accomplished by simply displacing a shaft end until it stops, which occurs when the clearance is closed, and setting the bore offset by the displaced amount. If the bearing geometry is known, the displaced amount can be calculated using the following formula:

$$\Delta a = 2m_o \left\{ \sin\alpha_o + \frac{\theta R_i}{2m_o} - \sqrt{1 - \left(\cos\alpha_o + \frac{\theta L}{4m_o}\right)^2} \right\}$$

where:

$\Delta a$=Axial clearance (mm)

$m_0$=Distance between inner and outer ring groove curvature centers (mm)

=$r_e + r_i - D_w$ $r_e$=Outer ring groove radius (mm)

$r_i$=Inner ring groove radius (mm)

$D_w$=Ball diameter $\alpha_0$=Initial contact angle (deg)

$\theta$=Angular clearance (radians)

$R_i$=Distance between shaft center and inner-ring groove curvature center (mm)

L=Distance between left and right groove centers of inner-ring (mm)

Setting $\Delta a$ to zero and solving for theta ($\theta$) will give the angle 42 between shaft 12 and bore 16. Setting theta=tan$^-$$_1$(x/D), where D=the distance between the opposite bearing and bearing center 20 and solving for x will give the offset distance 26 for zero clearance. The methods above will give a good starting point, though the optimum value may well be determined experimentally, particularly since some small amount of additional offset may be added for preloading the bearing.

EXAMPLE

Figure 2:
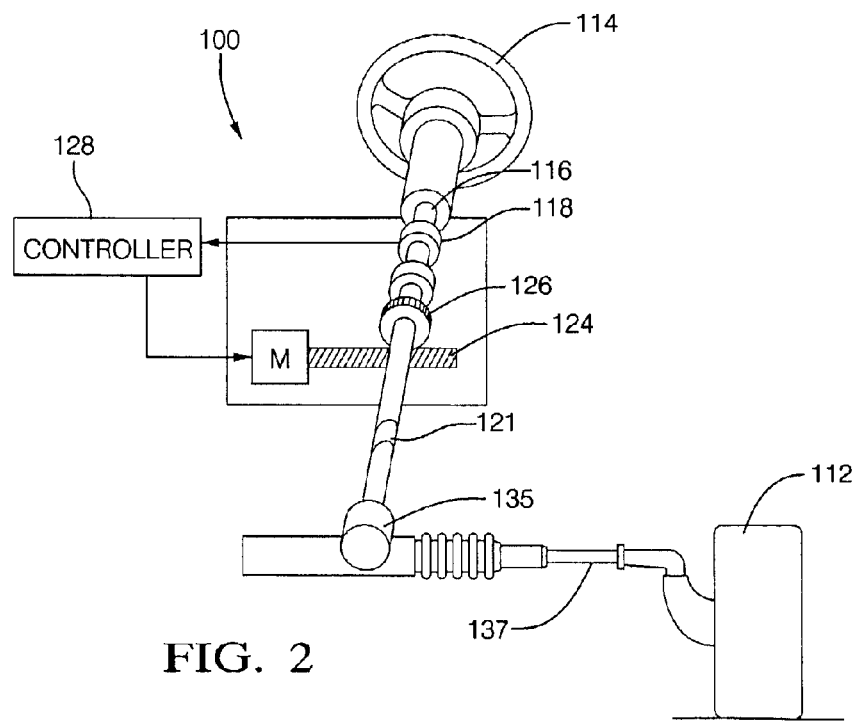
FIG. 2 shows an exemplary electric power steering system incorporating an offset-bearing.

FIG. 2 shows a schematic representation of an exemplary steering system 100 having electric power steering assist.

Handwheel 114 is fixed to shaft 116. Torque sensor 118 detects the torque in shaft 116 between handwheel 114 and worm gear 126. Controller 128 receives this torque information and other information (not shown) and outputs a signal to motor 122 which is connected to worm 124. Worm 124 engages worm gear 126 to produce an output torque against shaft 116. Lower shaft 121 is connected with tie-rod 137 via a rack and pinion gear set 135, thus translating rotary motion of lower shaft 121 into linear motion of tie rod 137. Tie rod is then connected to wheel 112 in a known manner to rotate the wheel on a generally vertical axis for steering the vehicle of which this system is a part.

Forces acting on wheel 112 from the road will act on rack and pinion gear set 135 and will translate into torque at worm gear 126. These rotational forces of worm gear 126 causes axial loads to bear against worm 124. Any axial movement of worm 124 results in noise can be felt and heard by a driver. One potential source of noise in this system is the bearings supporting the worm 124.

Figure 3:
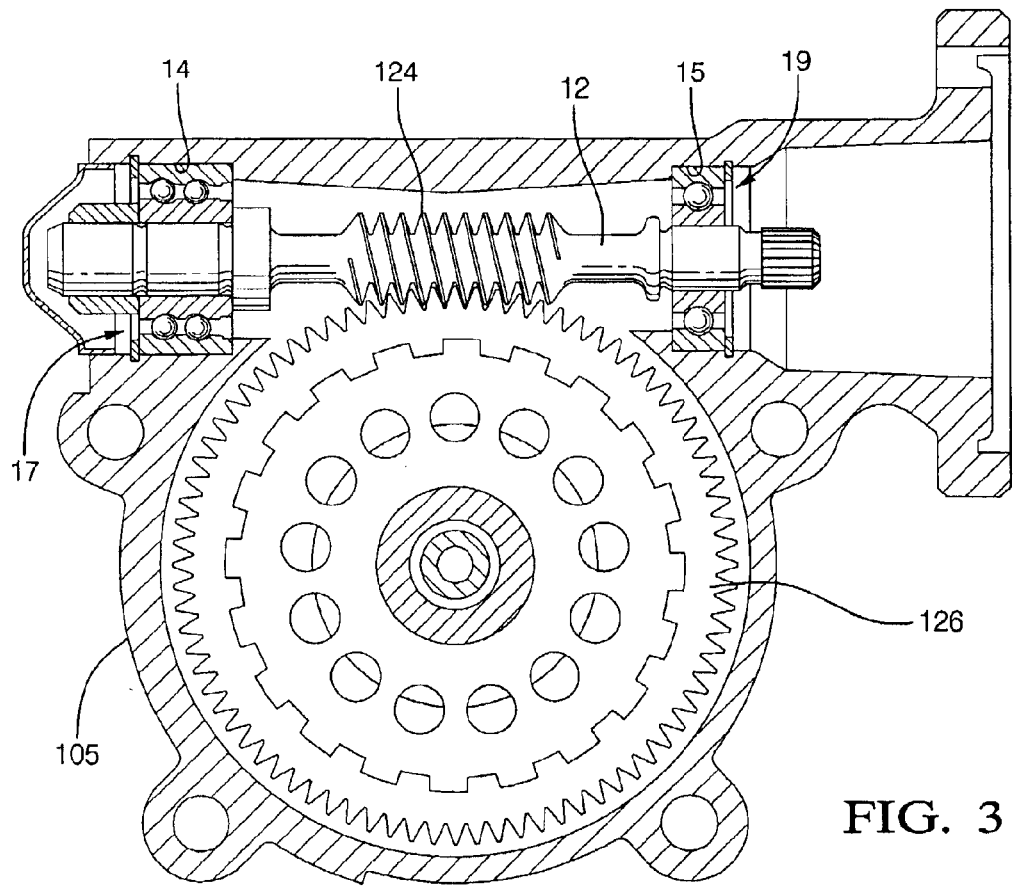
FIG. 3 shows an exemplary gear set with a worm mounted on bearings.

FIG. 3 shows a cross section view of the worm gear set shown in FIG. 2, with motor 122 removed. The specific system tested was a Fiat 188 electric power steering system. The assist mechanism housing 105 has four machined bearing bores. Two 47 mm bearing bores support the gear axis 102. A 30 mm single row bearing 19 and bearing set 17, which includes a 32 mm double row angular contact bearing, support shaft 12 which supports or is integral to worm 124. Bearing 17 is press fit on the I.D. with a slip fit on the O.D. Bearing 19 has slip fit features on the I.D. and the O.D. In this way, bearing set 17 supports all axial loading of shaft 12.

Figure 4:
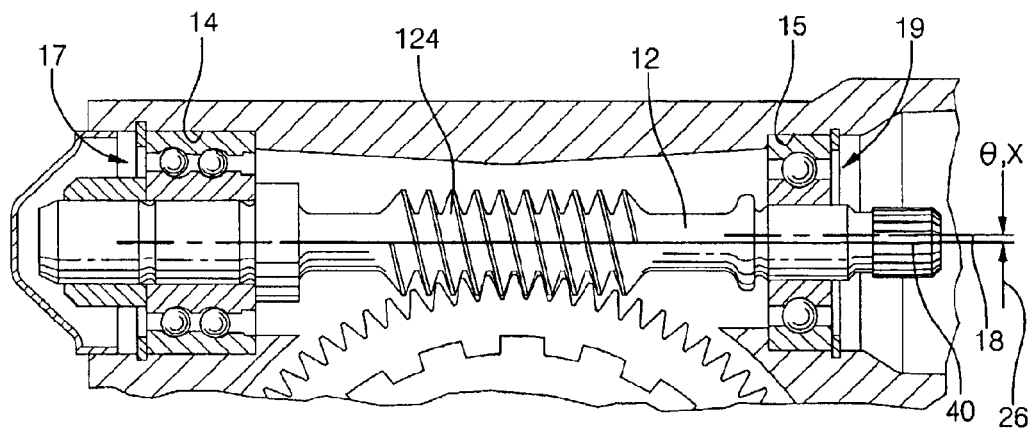
FIG. 4 shows a detail of the exemplary gear set of FIG. 2, showing the offset, which is exaggerated for clarity.

To eliminate internal clearance in bearing set 17 and reduce the noise in the system, bore 14, which supports bearing set 17, is intentionally offset from bore 15, which supports bearing set 19, by a certain amount. FIG. 4 shows a detail of FIG. 3, along with axes 40 and 18, which correspond to the axis of bore 14 and the axis of bore 15, respectively. The offset shown is exaggerated for clarity. It was found that an offset of 100 microns, within a tolerance of 20 microns, significantly reduced bearing noise in this system. The offset amount may include a nominal value and a tolerance including a range of values that includes the nominal value, where the range of values does not include zero.

Although the Example above is directed towards electric power steering systems, the offset may be useful in other applications where the shaft is subjected to varying axial loads or where bearing noise is problematic. Thus, while the invention has been shown and described with respect to a specific embodiment, it is to be appreciated that this embodiment is exemplary only of the invention, and not limiting. As will be appreciated by one skilled in the art, these and many other variations are possible without departing from the spirit and scope of the invention. Terms such as "first" and "second" as used herein are not intended to denote an order as in importance or position, but are merely used to distinguish between like elements.

What is claimed is:

1. A bearing configuration for noiselessly supporting a shaft subjected to axial loads comprising:
   a first bearing and a second bearing supporting the shaft, said second bearing being spaced from said first bearing;
   said first bearing and said second bearing being supported by a corresponding first bore and second bore in a shaft housing;
   a first axis coincident with an axis of the first bore;
   a second axis coincident with an axis of the second bore; and
   wherein said first axis and said second axis are purposefully offset from one another a sufficient distance to substantially eliminate internal clearance within the first bearing.

2. The bearing configuration of claim 1, said first bearing comprises a double row angular contact bearing.

3. The bearing configuration of claim 1 wherein a nominal amount of said offset is approximately determined by the formula:

$$\Delta a = 2m_o \left\{ \sin\alpha_o + \frac{\theta R_i}{2m_o} - \sqrt{1 - \left(\cos\alpha_o + \frac{\theta L}{4m_o}\right)^2} \right\}$$

where:
$\Delta a$ = Clearance, set to zero (mm)
$m_0$ = Distance between inner and outer ring groove curvature centers (mm)
   $= r_e + r_i - D_w$
$r_e$ = Outer ring groove radius (mm)
$r_i$ = Inner ring groove radius (mm)
$D_w$ = Ball diameter
$\alpha_0$ = Initial contact angle (deg)
$\theta$ = Angular clearance (radians)
$R_i$ = Distance between shaft cetner and inner-ring groove curvature center (mm) and
$L$ = Distance between left and right groove centers of inner-ring (mm),
wherein the nominal amount is approximated by substituting $\tan^{-1}(x/D)$ for $\theta$ in the above formula and solving for x, D being equal to the distance between centers of said first and second bearings, x being approximately equal to the nominal amount of the offset.

4. The bearing configuration of claim 1 wherein said offset includes a nominal value and a tolerance.

5. The bearing configuration of claim 1, said shaft supporting or integrally formed with a worm that engages a worm gear.

6. The bearing configuration of claim 5 wherein said worm gear is in operable communication with a steering shaft for a vehicle.

7. A method of manufacturing a bearing assembly comprising
   forming a first bore into a shaft housing, the first bore for supporting a first bearing set;
   selecting an offset amount sufficient to substantially eliminate internal clearance within a first bearing in the first bearing set used to support a shaft within said shaft housing;
   forming a second bore in said shaft housing spaced from said first bore, the second bore for supporting a second bearing set, said second bore being purposefully offset from said first bore by said offset amount;
   supporting said shaft for rotation in said shaft housing using said first bearing set positioned in said first bore and the second bearing set positioned in said second bore, said shaft extending between said first and second bearing sets.

8. The method of claim 7, wherein said supporting includes using a double row angular contact bearing as said first bearing.

9. The method of claim 7 wherein a nominal amount of said offset amount is approximately determined by the formula:

$$\Delta a = 2m_o \left\{ \sin\alpha_o + \frac{\theta R_i}{2m_o} - \sqrt{1 - \left(\cos\alpha_o + \frac{\theta L}{4m_o}\right)^2} \right\}$$

where:
    $\Delta a$=Clearance, set to zero (mm)
    $m_0$=Distance between inner and outer ring groove curvature centers (mm)
        =$r_e$+$r_i$–$D_w$
    $r_e$=Outer ring groove radius (mm)
  $r_i$=Inner ring groove radius (mm)
  $D_w$=Ball diameter
  $\alpha_0$=Initial contact angle (deg)
  $\theta$=Angular clearance (radians)
  $R_i$=Distance between shaft cetner and inner-ring groove curvature center (mm) and
    L=Distance between left and right groove centers of inner-ring (mm),
  wherein the nominal amount is approximated by substituting $\tan^{-1}(x/D)$ for $\theta$ in the above formula and solving for x, D being equal to the distance between centers of said first and second bearings, x being approximately equal to the nominal amount of the offset amount.

10. The method of claim 7 wherein said offset amount includes a nominal value and a tolerance.

11. The method of claim 7, further comprising causing a worm formed or fixed to said shaft to engage a worm gear within said shaft housing.

12. The method of claim 11 further comprising placing said worm gear in operable communication with a steering shaft for a vehicle.

13. A vehicular steering system comprising:
  a steering shaft;
  a worm gear in operable communication with said steering shaft;
  a worm engaged to said worm gear, said worm being fixed to a shaft that is supported by a bearing assembly, the bearing assembly comprising:
  a first bearing and a second bearing supporting the shaft, said second bearing being spaced from said first bearing;
  said first bearing and said second bearing being supported by a corresponding first bore and second bore in a shaft housing;
  a first axis coincident with an axis of the first bore;
  a second axis coincident with an axis of the second bore; and
  wherein said first axis and said second axis are purposefully offset from one another a sufficient distance to substantially eliminate internal clearance within the first bearing.

14. The steering system of claim 13 wherein said first bearing comprises a double row angular contact bearing.

15. The steering system of claim 13 wherein a nominal amount of said offset is approximately determined by the formula:

$$\Delta a = 2m_o \left\{ \sin\alpha_o + \frac{\theta R_i}{2m_o} - \sqrt{1 - \left(\cos\alpha_o + \frac{\theta L}{4m_o}\right)^2} \right\}$$

where:
    $\Delta a$=Clearance, set to zero (mm)
    $m_0$=Distance between inner and outer ring groove curvature centers (mm)
        =$r_e$+$r_i$–$D_w$
    $r_e$=Outer ring groove radius (mm)
  $r_i$=Inner ring groove radius (mm)
  $D_w$=Ball diameter
    $\alpha_0$=Initial contact angle (deg)
    $\theta$=Angular clearance (radians)
    $R_i$=Distance between shaft cetner and inner-ring groove curvature center (mm) and
    L=Distance between left and right groove centers of inner-ring (mm),
  wherein the nominal amount is approximated by substituting $\tan^{-1}(x/D)$ for $\theta$ in the above formula and solving for x, D being equal to the distance between centers of said first and second bearings, x being approximately equal to the nominal amount of the offset.

16. The steering system of claim 13 wherein said offset includes a nominal value and a tolerance.

* * * * *